Patented Nov. 13, 1951

2,574,785

UNITED STATES PATENT OFFICE 2,574,785

INGREDIENT OF ADHESIVES AND A PROCESS OF MAKING IT

Clark C. Heritage, Cloquet, Minn., assignor to Weyerhaeuser Timber Company, Longview, Wash., a corporation of Washington No Drawing. Application April 12, 1947, Serial No. 740,987

17 Claims. (Cl. 106—203)

This invention relates to a process for treating vegetable shell material for use as a constituent of adhesive compositions; and to provide as a constituent of adhesive compositions the reaction product of a mixture of water, a basic acting compound of an alkali metal and/or an alkaline earth metal, and a vegetable shell material.

The compositions of the instant invention essentially comprise vegetable shell material and an alkaline reacting compound. For convenience in preparation an aqueous vehicle may be employed to insure complete mixing of the ingredients. The vegetable shell material reacts with the alkaline compound to produce resinous products which are capable of further reaction with thermosetting resins to produce adhesives of especially high bonding strength.

Vegetable shell materials especially suitable for use in the preparation of the products of the invention include a wide variety of nut shells such as walnut, filbert and hickory, the endocarps or stones of drupes, such as the apricot, peach and prune, and the barks of trees, particularly the coniferous trees of commerce such as the firs, the pines, the cedars and the hemlocks, the bark of such trees being readily obtainable as a byproduct of industries utilizing the woody portion of the trees.

In general, the barks of trees comprise the cork, phelloderm, and the parenchyma tissue and sclerenchyma tissue of the bark phloem. Pieces of bark from separate trees show a wide variation of relative amounts of cork and phloem, grading from pieces consisting almost entirely of phloem and having but thin lunes of cork to those consisting of large masses of cork or phelloderm with small islands of phloem existing in the cork. The phellem or cork is composed of layers of non-elongated suberized cells partially filled with air and of low specific gravity. In shape and size many kinds of cells occur in sclerenchyma, but two general types are recognized—fibers, such as the bast fibers found in the bark of the Douglas fir, and stone cells, as found in hemlock bark, the shells of nuts, the hard parts of seeds and hard fruits, these being made up largely of stone cells of various types. The walls of stone cells are very thick and strongly lignified. The stone cells comprise about 10% wax content and 5% tannin, the major constituent being lignin. The parenchyma tissue is composed initially of sieve tubes and other portions of the phloem exclusive of the sclerenchyma tissue. The chemical analysis of these products discloses that they comprise lignin in major proportion.

These products may be obtained from the barks of trees, for example, by a process which comprises so adjusting the friability of the bark matrix that a suitable comminuting process such as ball milling may be employed to pulverize the constituents of the bark differentially while simultaneously breaking the bonds therebetween so as to permit separation of these constituents by selective screening. Certain of the bark fractions, such as the cork and fiber fractions, are less friable than the others, and it may be desirable to separate these fractions from the more easily comminuted fractions in the preparation of bark for use as a constituent of adhesive compositions. Moreover, the cork and fiber fractions may be recovered substantially free from admixture or contamination, and are useful for various purposes.

The particle size of the comminuted shell material is variable. In general, shell material ground to pass through 65-mesh Tyler screens gives consistently good results when used in accordance with the teaching of the invention as an ingredient of the herein disclosed adhesive compositions. Satisfactory particle sizes are illustrated by the following Tyler screen analyses of six different lots of comminuted bark of suitable grade for adhesive manufacture:

| Screen size | Per Cent By Weight Yield | | | | | |
|---|---|---|---|---|---|---|
| On 65 | 1.0 | 1.0 | 1.0 | 1.0 | 1.5 | 1.5 |
| 100 | 10.0 | 13.0 | 14.0 | 13.5 | 17.5 | 13.5 |
| 200 | 38.0 | 36.5 | 37.5 | 37.5 | 40.5 | 36.5 |
| Thru 200 | 51.0 | 49.5 | 47.5 | 48.0 | 40.5 | 48.5 |

For commercial use it is recommended that the cork and fiber fractions of the bark be removed. The resulting product is a dark colored (usually brown) pulverulent material which comprises principally the parenchyma tissue of bark phloem and contains not substantially more than about 20% by weight of non-phloem constituents. The comminuted product resulting from the above treatment of Douglas fir bark has a density of about 1.17 grams per cubic centimeter. The pH of a hot aqueous mixture containing 10 grams of powdered product per 100 cubic centimeters of water is about 3.5. A chemical analysis, expressed in per cent by weight, of a representative sample is as follows:

| | |
|---|---|
| Lignin | 55 |
| Polysaccharides | 17 |
| Pentosans | 12 |
| Water solubles | 8 |
| Ether solubles | 5 |
| Ash | 3 |

Alkaline materials are incorporated in the mixture to condition the shell material and to promote condensation and subsequent setting of the final adhesive composition. Suitable alkaline materials are, in general, the hydroxides, carbonates, and/or bicarbonates of the alkali metals, particularly sodium and potassium. Sodium hydroxide and sodium carbonate are particularly suitable for this purpose. The necessary or optimum amount is variable depending upon the nature and quantity of the other constituents of the mixture and upon the desired quality of adhesion. A suitable mixture for plywood adhesives comprises about 4 parts sodium hydroxide and about 5 parts of sodium carbonate.

The invention is illustrated by the following procedure: A hot aqueous solution containing about 10% by weight of alkali is prepared by dissolving sodium hydroxide, for example, in water at about 185° F. This hot solution is added to shell material in such quantity as to obtain a mixture containing from about 25% to about 40% by weight of the shell material. The heating of the solution is optional, but it has been observed that dissolution of the alkali and wetting of the shell material is enhanced considerably by such heating. When the mixture is heated, temperatures in the range of from 150° to 200° F. are preferred. The suspension is allowed to react, the time for complete reaction being proportional to the heat employed and the amount of alkali present. Under conditions disclosed above, the reaction is completed in about 20 minutes, and the resulting product may thereupon be incorporated in the final adhesive, or the product may be dried. Drying may conveniently be effected in an oven maintained at an elevated temperature, but conventional air drying or other means may be employed.

The resulting dry resinous product is quite hard and porous, and is readily soluble in water. It may be packaged in such form or may preferably be ground to a powder. The product may then be incorporated with a thermosetting resin in the manufacture of adhesives for use, for example, in the manufacture of exterior grade plywood. Such resins may comprise the alkali catalyzed polymerization products of an aldehyde, e. g. formaldehyde or acetaldehyde, and a phenol, e. g. phenol itself, cresols, xylenols and/or other substituted phenols. Other aldehydic condensation products well known in the industry and which may be employed in the formulation of adhesive compositions embodying the invention are the urea aldehyde and melamine aldehyde type of resins. These are most commonly produced by condensation of the resin and formaldehyde in aqueous solution in the presence of a catalyst. For example, a colloidal suspension or solution of resin is produced by mixing a phenolic body and formaldehyde in an aqueous alkaline solution and heating the mixture until the reaction is at the desired end point. A suitable viscosity is obtained by adding water or a dilute caustic soda solution. The proportion of solids usually is adjusted to about 50%.

Use of the alkali-shell material reaction product as a constituent of adhesive compositions results in the formation of exceptionally strong bonds uniting the glued surfaces, as is shown, for example, by the results of shear and wood failure tests, hereinafter described, carried out on plywood in which such adhesives are employed. It has been established that the quality of the bond is attributable, at least in part, to the fact that the alkali-shell material constituent of the adhesive mixture participates actively in the chemical reactions and changes occurring during the setting process. The reaction product is heat reactive and, when the premix comprises comminuted bark, is adhesive in character and appreciably augments the adhesive properties of the mixture. Adhesives embodying the composition of the invention are lower in cost than comparable adhesives of the prior art and, when employed in the manufacture of plywood, result in substantial savings. This reduction in cost is at least partly attributable to the fact that less adhesives (i. e. lower spreads) may be employed, and also to the fact that the adhesive mixture may contain relatively inexpensive ingredients, i. e. the comminuted shell material, and water, in major proportion. The final adhesive is easily handled and may be used in ordinary gluing and pressing machines. It is characterized by exceptionally good spreadability, due perhaps to the fact that the alkali-shell material reaction product is soluble in water and is incorporated in the final adhesive in the form of a solution. Rough surfaces such as rough core veneers are completely covered by relatively low spreads of the adhesive, and the bonds are exceptionally durable and withstand long periods of use under adverse conditions without delamination or other evidences of failure.

The proportions of thermosetting resin and alkali-shell material reaction product are variable, depending upon such factors as the nature of the product to be glued and the use to which said product is to be put. Thus, although 80 to 100 parts of thermosetting resin may be used per 20 parts of alkali-shell material reaction product in the manufacture of exterior grade plywood, lesser quantities of resin may be used in the manufacture of other types of products. For example, as little as 8 parts of resin per 20 parts of reaction product may be used for the production of interior grade plywood, while usages of about 25 parts of resin per 20 parts of reaction product are acceptable for the manufacture of concrete form plywood. Since the reaction product of the invention comprises necessary and desired components of the final adhesive, it is only necessary that the resin and the reaction product be combined in the desired proportions to obtain an adhesive designed for a specific purpose. Conventional methods may be employed to effect the combination, it being preferred to dissolve the reaction product in water and subsequently add the resin thereto. Although variable amounts of water may be used, in general, these amounts are considerably greater with the herein described adhesive compositions than with other wet adhesives. Thus whereas only about 20 parts water are used per 100 parts resin in prior art adhesives, the proportion of water may be increased to as high as 40 parts water in adhesive compositions in which an alkali-shell material reaction product is incorporated in accordance with the invention.

The following examples of typical formulations are intended to illustrate the process of the invention whereby reaction products suitable for use as active constituents of thermosetting adhesives are prepared. The proportions of ingredients are expressed as parts by weight.

Compositions prepared as described in the following examples were incorporated in thermosetting adhesives and used in the manufacture of plywood comprising three ⅛″ wood veneers, the adhesive being applied to each face of the core veneer at the rate of from 42 to 48 pounds wet adhesive per thousand square feet double glue line. Other details of production procedure were: Assembly time, 10 minutes; pressing duration, two to three minutes; pressure, 200 to 210 pounds per square inch; platen temperature, 280° F.

Standard shear and wood failure tests were used for evaluating the bonds produced with adhesives embodying the invention. According to these, specimens to be tested in the wet condition for shearing strength at rupture are subjected to a destructive cycle consisting of boiling plywood specimens in water for four hours, baking them at 140° F. for twenty hours, and again boiling for four hours. At the end of a second boil the specimens are cooled and tested in a Riehle shear testing machine at a constant rate of loading of 750 pounds per minute, the shearing stress at rupture being recorded in pounds per square inch. The per cent wood failure over the area of the ruptured joint is estimated visually and recorded in per cent.

*Example I*

An aqueous alkaline solution was prepared by dissolving 40 parts of sodium hydroxide in 400 parts of water at about 185° F. The hot solution was added to 160 parts of —65 mesh material comprising non-fibrous bark phloem and the mixture agitated during the period of reaction of about 20 minutes. The product thus obtained was then treated at 105° C. until oven dry, and then ground to a powder.

To 200 parts of the reaction product prepared as in Example I was added 250 parts of water and, after dilution, 1000 parts of a phenol-aldehyde resin solution added by mixing. This mixture was compounded on mixing rolls to a viscosity of about 1600 centipoises and applied to core veneers at the rate of about 45 pounds per thousand square feet of double glue line. Each face of the core veneer was coated with the adhesive and the panels assembled in the customary manner, i. e., with the grain of the face veneer disposed across or at right angles to the grain of the core veneer. The panels were pressed in a hot press for 2.5 minutes and then tested according to the hereinabove described procedure. A wet shear of 196 pounds per square inch and wood failure of 95% was observed.

*Example II*

To a dry mixture comprising 160 parts non-fibrous bark phloem as in Example I, 20 parts calcium hydroxide and 26 parts sodium carbonate, was added 250 parts of water heated to about 185° F. The suspension was stirred during the reaction time of about 20 minutes and the product thus obtained was oven dried at 105° C. and subsequently ground to a powder.

To 50 parts of sodium carbonate in 400 parts of water was added 240 parts of the composition prepared in Example II and, after dilution, 1000 parts of a phenol-aldehyde resin added by stirring. An adhesive having a viscosity of 900 centipoises was prepared and applied to core veneers in the manufacture of plywood as described above. The panels were pressed for 3 minutes and tested according to the described procedure. A wet shear of 174 pounds per square inch and wood failure of 94% was observed.

*Example III*

Four parts of sodium hydroxide and 5 parts of sodium carbonate were dissolved in 40 parts of water heated to about 180° F. This solution was then added to 20 parts of comminuted walnut shell material and the resulting suspension was agitated for 20 minutes to complete the reaction. The product was dried in an oven at 105° C. and then ground to a powder. A thermosetting adhesive was prepared from this product by stirring it into 40 parts of water and, after dilution, adding 100 parts of a phenol-aldehyde resin. The resulting product was compounded to a viscosity of 1200 centipoises and applied to wood veneers at the rate of about 46 pounds per thousand square feet of double glue line. The assembled panels were pressed for 3 minutes and tested as hereinbefore described, giving a dry shear of 212 pounds per square inch and a wet shear of 171 pounds per square inch. Wet and dry wood failures were 99 and 98%, respectively.

*Example IV*

4 parts of sodium hydroxide were dissolved in 35 parts of hot water and the solution was then added to 16 parts of comminuted walnut shell material. After stirring for 20 minutes the reaction was complete and the product was oven dried and ground to a powder. In preparing the final adhesive, to the reaction product was added 35 parts of water and 100 parts of a phenol-aldehyde resin. After compounding to a viscosity of 700 centipoises, the adhesive was applied to core veneers as in Example III and the assembled panels pressed for 2.5 minutes. Tests performed on the plywood gave results as follows: Wet and dry shear values of 188 and 211 pounds per square inch, respectively. Wood failure under both conditions was about 98%.

*Example V*

About 20 parts by weight of non-fibrous bark phloem, 5 parts sodium carbonate, 4 parts sodium hydroxide, and 40 parts water (at 180° F.) were reacted for twenty minutes and allowed to cool to room temperature. To the viscous solution thus obtained was added about 100 parts of a fluid phenol-formaldehyde resin and the mixture allowed to react at room temperature for about 10 minutes. The viscosity of the final mixture as determined in a MacMichael viscosimeter was 1500 centipoises at 77° F.

The adhesive thus prepared was applied to the manufacture of $\frac{5}{16}''$ and $\frac{7}{16}''$ plywood using spreads of from 42 to 48 pounds per thousand square feet double glue line, the other conditions of manufacture being substantially those outlined hereinabove. Average dry shear value obtained for $\frac{5}{16}''$ panels was about 210 pounds per square inch with wood failure of about 94%. Wet shear was about 115 pounds per square inch with 97% wood failure. For $\frac{7}{16}''$ panels, dry shear of about 165 pounds per square inch and wood failure of 93% were observed, with wet shear of about 140 pounds per square inch and wood failure of 96%.

In the preferred method for preparing the products of the invention, an aqueous vehicle is employed to insure complete mixing of the components of reaction, as hereinabove disclosed. Other methods of preparing the mixture may be employed, however, involving, for example, the mixing of dry chemicals with otherwise untreated shell material at the time of packaging. In such a mix it is recommended that calcium hydroxide and sodium carbonate be used in place of sodium hydroxide because of the deliquescent nature of the latter chemical and consequent difficulties in handling and shipping. Upon addition of the water of dilution at the time of preparing the final adhesive the two chemicals, calcium hydroxide and sodium carbonate, react to generate sodium hydroxide by a process of double decomposition. The chemical reaction between the calcium hydroxide and sodium carbonate in the presence of water results in the precipitation of calcium carbonate and the release of hydroxyl ions in a quantity proportional to that available when sodium hydroxide is used in the formulation. The formulation disclosed in Example VI contains equimolecular quantities of calcium hydroxide and sodium carbonate.

*Example VI*

To 160 parts shell material was added 20 parts calcium hydroxide and 26 parts sodium carbonate. At the time of preparing the final adhesive this mixture was added to water at about 185° F. in the following proportion, expressed as parts by weight: Premix 206 parts, water 250 parts. The mixture of premix and water was stirred for about 20 minutes to complete the reaction. After thorough mixing, 1000 parts of a phenolic resin were added and mixing continued for an additional 10 minutes. The resulting product was compounded to a viscosity of 1600 centipoises and applied to core veneers at the rate of about 45 pounds per thousand square feet of double glue line. Maximum press time was 2½ minutes after an assembly time of 10 minutes, and standard shear and wood failure tests indicated wet shear values of from 176 to 184 pounds per square inch and wood failure from 87% to 92%.

In the following example sodium hydroxide is generated by the process of double decomposition, 26 parts of sodium carbonate reacting with 20 parts of calcium hydroxide upon the addition of water at the time of preparation of the final adhesive. An excess of sodium carbonate is used in order to provide a formulation for the final adhesive containing 50 parts sodium carbonate.

*Example VII*

To 200 parts shell material was added 20 parts calcium hydroxide and 76 parts sodium carbonate. At the time of preparing the final adhesive, this premix was added to 400 parts water and the mixture stirred for about 20 minutes. At the end of the reaction period 1000 parts resin were added and mixing continued for an additional 10 minutes. The adhesive was compounded to a viscosity of 900 centipoises and applied to core veneers at the rate of about 45 pounds per 1000 square feet double glue line. Assembly time was 10 minutes, maximum press time 3 minutes, and standard shear and wood failure values were from 148 to 174 pounds per square inch wet shear and from 85 to 95% wood failure.

It is apparent from a consideration of the data obtained above that the hereinbefore mentioned vegetable shell materials may be used interchangeably when compounded with thermosetting resins. By use of the compositions of the invention in the formulation of thermosetting adhesives there is advantageously effected a simplified procedure in their preparation, it being necessary only to mix in desired proportions a thermosetting resin and a composition containing all of the other required and desired components of the adhesive.

Having now described my invention and in what manner the same may be used, what I claim as new and desire to protect by Letters Patent is:

1. An ingredient for compounding an adhesive consisting of the reaction mass resulting from chemically reacting finely comminuted vegetable material of the class consisting of tree bark, nut shells and the endocarps of drupes and an alkali in about 8% to 20% aqueous solution, the proportion of alkali solution to the vegetable material and the time of treatment at temperatures in the range from about 150° to about 200° F. being such as to effect substantially complete reaction between the vegetable material and the alkali.

2. The reaction mass resulting from chemically reacting finely comminuted vegetable material of the class consisting of tree bark, nut shells and the endocarps of drupes and a basic acting compound of an alkali metal in about 8% to 20% aqueous solution, the proportion of solution of said basic acting compound to vegetable material and the time of treatment at a temperature in the range from about 150° to about 200° F. being such as to effect substantially complete reaction between the vegetable material and said basic acting compound.

3. The composition of claim 1 wherein the vegetable material comprises nut shell material.

4. The composition of claim 1 wherein the vegetable material comprises chiefly the non-fibrous component of bark phloem.

5. The composition of claim 1 wherein the alkali is sodium hydroxide.

6. The composition of claim 2 wherein the basic acting compound of alkali metal comprises sodium hydroxide and sodium carbonate.

7. The composition of claim 2 wherein the vegetable material comprises principally the non-fibrous component of bark phloem, and the basic acting compound of alkali metal comprises sodium hydroxide and sodium carbonate.

8. The reaction mass resulting from chemically reacting finely comminuted vegetable material of the class consisting of tree bark, nut shells and the endocarps of drupes and calcium hydroxide and sodium carbonate in about 8% to 20% aqueous solution, the proportion of alkaline solution to vegetable material and the time of treatment at a temperature in the range from about 150° to about 200° F. being such as to provide for substantially complete reaction between the vegetable material and the alkaline solution.

9. As an ingredient for adhesive compositions, the resinous product resulting from the reaction between the finely comminuted non-fibrous component of bark phloem and about 8% to 20% aqueous alkaline solution containing equi-molecular quantities of calcium hydroxide and sodium carbonate.

10. As an ingredient for adhesive compositions, the resinous product resulting from the reaction between finely comminuted vegetable material of the class consisting of tree bark, nut shells and the endocarps of drupes and about an 8% to 20% aqueous alkaline solution containing equi-molecular quantities of calcium hydroxide and sodium carbonate, the proportion of said alkaline solution to vegetable material and the time of treatment at a temperature in the range from 150° to 200° F. being such as to provide for substantial completion of reaction between the vegetable material and the alkaline solution.

11. The composition of claim 10 wherein the vegetable material comprises chiefly the non-fibrous component of bark phloem.

12. The composition of claim 10 wherein the vegetable material comprises nut shell material.

13. A process for treating vegetable material to produce a resinous product, comprising reacting finely comminuted vegetable material of the class consisting of tree bark, nut shells, and the endocarps of drupes with about an 8% to 20% aqueous solution of a basic acting compound of an alkali metal at temperatures within the range of from about 150° F. to about 200° F., and drying the resulting reaction product.

14. A process for preparing resinous products for use in adhesive compositions comprising reacting finely comminuted vegetable material of the class consisting of tree bark, nut shells, and the endocarps of drupes with an aqueous solution of a basic acting compound of an alkali metal at a temperature of about 185° F. for a time of about 20 minutes, and drying the resulting reaction product.

15. A process of preparing adhesive compositions which comprises pretreating finely comminuted vegetable material of the class consisting of tree bark, nut shells, and the endocarps of drupes, by chemically reacting said vegetable material with a reagent comprising a basic acting compound of an alkali metal in aqueous medium at a temperature in the range from about 150° F. to about 200° F. and admixing the resulting reaction product with a thermosetting resin.

16. The process according to claim 15 wherein the reaction is conducted at a temperature of about 180° F.

17. The process according to claim 15 wherein the vegetable material comprises principally the non-fibrous component of bark phloem.

CLARK C. HERITAGE.

REFERENCES CITED

The following references are of record in the file of this patent:

UNITED STATES PATENTS

| Number | Name | Date |
|---|---|---|
| 118,177 | Allen | Aug. 22, 1871 |
| 1,718,012 | Vogt et al. | June 18, 1929 |
| 1,828,028 | Darling | Oct. 20, 1931 |
| 2,314,203 | Fairclough | Mar. 16, 1943 |
| 2,319,182 | Vander Pye | May 11, 1943 |
| 2,325,570 | Katzen et al. | July 27, 1943 |

FOREIGN PATENTS

| Number | Country | Date |
|---|---|---|
| 3,211 | Great Britain | of 1906 |
| 289,676 | Great Britain | May 3, 1928 |
| 12,443 | Australia | Mar. 20, 1929 |
| 490,510 | Great Britain | Aug. 11, 1938 |

OTHER REFERENCES

Webster's New International Dictionary of the English Language, second ed. Unabridged (1941), pgs. 220 and 2309, G & C Merriam Co., pub., Springfield, Mass.